United States Patent [19]

Distler et al.

[11] 3,862,966
[45] Jan. 28, 1975

[54] 2,5-DIMETHYL FURAN-3-CARBOXYLIC ACID CYCLOHEXYLAMIDE

[75] Inventors: Harry Distler, Ludwigshafen; Rudi Widder, Eppelheim; Ernst-Heinrich Pommer, Limburgerhof, all of Germany

[73] Assignee: Badische Anilin-Soda-Fabrik Aktiengesellschaft, Ludwigshafen, Germany

[22] Filed: Apr. 5, 1971

[21] Appl. No.: 131,545

[30] Foreign Application Priority Data

Apr. 23, 1970 Germany.............................. 2019535

[52] U.S. Cl............................. 260/347.3, 424/285
[51] Int. Cl................................................ C07d 5/16
[58] Field of Search.................................. 260/347.3

[56] References Cited
UNITED STATES PATENTS

| 3,352,663 | 11/1967 | Freund............................. 260/347.3 |
| 3,352,663 | 11/1967 | Freund et al. ........................ 71/2.5 |

FOREIGN PATENTS OR APPLICATIONS 1,914,954   10/1969   Germany

Primary Examiner—Henry R. Jiles
Assistant Examiner—Bernard Dentz
Attorney, Agent, or Firm—Johnston, Keil, Thompson & Shurtleff

[57] ABSTRACT 2,5-dimethyl-furan-3-carboxylic acid cyclohexylamide which has a good fungicidal action and a process for controlling fungi with this compound.

1 Claim, No Drawings

2,5-DIMETHYL FURAN-3-CARBOXYLIC ACID CYCLOHEXYLAMIDE

The present invention relates to a new and valuable substituted furancarboxylic acid cycloalkylamide and fungicides containing this compound.

It is known to use tetramethylthiuram disulfide for controlling fungi. It is also known that substituted furancarboxylic acid anilides (Belgian Pat. No. 734,808), 2-methylfuran-3-carboxanilide and 3-methylfuran-2-carboxanilide (German Printed Application No. 1,914,954) exhibit fungicidal activity.

We have now found that 2,5-dimethylfuran-3-carboxylic acid cyclohexylamide has a good fungicidal action. This action is particularly in evidence on fungi of the Basidimycetes class such as rust fungi in crop plants, and on soil-borne fungi, such as Rhizoctonia solani and Sclerotium rolfsii. The compound is also effective on plant pathogens which may be transmitted via seeds, such as Fusarium nivale (snow mold) and ligniperdous fungi, such as Coniophora cerebella.

The preparation of the compound of the invention is illustrated in the following example.

EXAMPLE 1

At 25° to 35°C, 15.85 parts by weight of 2,5-dimethyl-3-furancarboxylic acid chloride and 10.1 parts of triethylamine are added to 9.9 parts of cyclohexylamine in 50 parts of ethylene chloride. After stirring for 3 hours at 35°C, 50 parts of water is added and the organic phase separated. After drying the organic phase with $Na_2SO_4$, the solvent is removed at subatmospheric pressure.

Yield: 21.4 parts (96.8% of theory) of 2,5-dimethylfuran-3-carboxylic acid cyclohexylamide as colorless crystals.

Melting point: 118° to 119°C (recrystallized from petroleum ether) $C_{13}H_{19}O_2N$ (molecular weight: 221)

|        | C     | H    | O     | N    |
|--------|-------|------|-------|------|
| calc.: | 70.5% | 8.6% | 14.5% | 6.4% |
| found: | 70.2% | 8.7% | 14.6% | 6.1% |

The fungicides according to this invention may be used as solutions, emulsions, suspensions or dusts. The form of application depends on the purpose for which the agents are being used; in any case it should ensure a fine distribution of the active ingredient.

For the preparation of solutions to be sprayed direct, hydrocarbons having boiling points higher than 150°C, e.g. tetrahydronaphthalene and alkylated naphthalenes, or organic liquids having boiling points higher than 150°C anad one or more than one functional group, e.g., the keto group, the ether group, the ester group or the amide group, this group or these groups being attached as substituent(s) to a hydrocarbon ring or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g., polyethylene oxide adducts. Concentrates which are suitable for dilution with water may be prepared from active ingredient, emulsifying or dispersing agent and possibly solvent. Compounds having adequate basicity may be used as salts in aqueous solution even after formation of the salt.

Dusts may be prepared by mixing or grinding the active ingredients with a solid carrier, e.g., kieselguhr, talc, clay or fertilizers.

The good fungicidal action of the compound of this invention is demonstrated in the following examples.

EXAMPLE 2

The active ingredients are dissolved in acetone in amounts of 0.01 and 0.005% (by weight) and uniformly dispersed in a still liquid nutrient agar. The agar is poured into Petri dishes having a diameter of 9 cm. After the agar has solidified, the dishes are centrally inoculated with mycelium flakes of Rhizoctonia solani, Sclerotium rolfsii, and Coniophora cerebella, and conidia of Fusarium nivale. The dishes are incubated at 25°C and the extent of the development of the fungus colony is assessed after 6 days.

0 = no fungus growth
1 = diameter of fungus colony 0.5 to 1.5 cm
2 = diameter of fungus colony 1.5 to 3.5 cm
3 = diameter of fungus colony 3.5 to 4.5 cm
4 = diameter of fungus colony 4.5 to 7 cm
5 = diameter of fungus colony 7 to 9 cm

| Active ingredient | Rhizoctonia solani % age of active ingredient in agar | | Sclerotium rolfsii % age of active ingredient in agar | | Coniophora cerebella % of active ingredient in agar | | Fusarium nivale % age of active ingredient in agar | |
|---|---|---|---|---|---|---|---|---|
| | 0.01 | 0.005 | 0.01 | 0.005 | 0.01 | 0.005 | 0.01 | 0.005 |
| Example 1 | 0 | 0 | 0 | 0 | 0 | 0 | 0 | 0 |
| Tetramethylthiuram disulfide (comparative agent) | 4 | 4 | 3 | 4 | 4 | 5 | 2 | 3 |
| Control (untreated) | 5 | | 5 | | 5 | | 5 | |

EXAMPLE 3

Leaves of pot-grown bean plants of the Saxa variety are artificially infected with spores of bean rust (Uromyces appendiculatus) and placed in a steam-saturated chamber for 24 hours at 22° to 24°C. The plants are then sprayed with aqueous emulsions consisting of 80% of active ingredient and 20% of emulsifier and left in a greenhouse at 22° to 25°C and a relative humidity of 60 to 70%. Fungus attack is assessed after 8 days.

| Active ingredient | Extent of attack after treatment with spray containing 0.1, 0.05 and 0.025% of active ingredient | | |
|---|---|---|---|
| | 0.1 | 0.05 | 0.025 |
| Example 1 | 0 | 0 | 0 |
| Control (untreated) | 5 | | |

0 = no fungus attack, graduated down to
5 = leaves completely covered

EXAMPLE 4

70 parts by weight of the compound of Example 1 is mixed with 30 parts by weight of N-methyl-α-pyrrolidone. A mixture is obtained which is suitable for application in the form of very fine drops.

EXAMPLE 5

20 parts by weight of the compound of Example 1 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 6

20 parts by weight of the compound of Example 1 is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 7

20 parts by weight of the compound of Example 1 is dissolved in a mixture consisting of 25 parts by weight of cyclohexanol, 65 parts by weight of a mineral oil fraction having a boiling point between 210° and 280°C, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 8

20 parts by weight of the compound of Example 1 is well mixed with 3 parts by weight of the sodium salt of diisobutylnaphthalene-α-sulfonic acid, 17 parts by weight of the sodium salt of a ligninsulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1% by weight of the active ingredient.

EXAMPLE 9

3 parts by weight of the compound of Example 1 is intimately mixed with 97 parts by weight of particulate kaolin. A dust is obtained containing 3% by weight of the active ingredient.

EXAMPLE 10

30 parts by weight of the compound of Example 1 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:
1. 2,5-dimethylfuran-3-carboxylic acid cyclohexylamide.

* * * * *